United States Patent [19]
Sasaki

[11] 4,449,417

[45] May 22, 1984

[54] CARRIER MOVING MECHANISM

[75] Inventor: Masao Sasaki, Tokyo, Japan

[73] Assignee: Oki Electric Industry Co., Ltd., Tokyo, Japan

[21] Appl. No.: 357,725

[22] Filed: Mar. 12, 1982

[30] Foreign Application Priority Data

Mar. 16, 1981 [JP] Japan .............................. 56-35380[U]

[51] Int. Cl.³ ........................ F16H 55/18; F16H 1/18; F16H 1/20
[52] U.S. Cl. ................................ 74/409; 74/424.8 A; 74/441
[58] Field of Search ................ 74/424.8 A, 441, 440, 74/409, 424.8 R, 89.15

[56] References Cited

U.S. PATENT DOCUMENTS

| | | | |
|---|---|---|---|
| 525,780 | 9/1894 | Boynton | 74/441 |
| 1,707,442 | 4/1929 | Maag | 74/441 |
| 2,679,168 | 5/1954 | Rokos | 74/441 |
| 2,857,778 | 10/1958 | Rokos | 74/441 |
| 3,483,765 | 12/1969 | Fornataro | 74/89.15 |
| 3,670,583 | 6/1972 | Leming | 74/89.15 |
| 3,703,835 | 11/1972 | O'Connor et al. | 74/441 |
| 3,861,411 | 1/1975 | Mitchell et al. | 74/89.15 |
| 3,895,543 | 7/1975 | Metzger et al. | 74/89.15 |
| 4,279,173 | 7/1981 | Krebs et al. | 74/441 |

FOREIGN PATENT DOCUMENTS

| | | | |
|---|---|---|---|
| 1077304 | 5/1980 | Canada | 74/89.15 |
| 518976 | 2/1931 | Fed. Rep. of Germany | 74/441 |
| 1074324 | 7/1967 | United Kingdom | 74/89.15 |

OTHER PUBLICATIONS

*Mechanisms, Linkages, and Mechanical Controls*, pp. 304 and 316–317, "Basic Types of Mechanical Clutches", Marvin Taylor, 1965.

*Primary Examiner*—Lawrence J. Staab
*Assistant Examiner*—Michael D. Bednarek
*Attorney, Agent, or Firm*—Peter L. Berger

[57] ABSTRACT

Disclosed is a carrier moving mechanism for preventing occurrence of the backlash between a screw shaft and a carrier transmitted by this screw shaft. This carrier moving mechanism comprises a screw shaft and a carrier having secured thereon first and second nuts having teeth to be engaged with the lead of this screw shaft, in which the teeth of the first nut are brought into contact with one side face of the lead of the screw shaft and the teeth of the second nut are brought into contact with the other side face of the lead of the screw shaft and the carrier is moved through these first and second nuts by rotation of the screw shaft. This carrier moving mechanism is characterized in that the carrier moving mechanism comprises a supporting mechanism which supports one of the first and second nuts on the carrier so that the supported nut can be rotated in the rotation direction of the screw shaft but the movement of the supported nut in the axial direction of the screw shaft is restricted, bias means for biassing the supported nut to rotate the supported nut in the direction eliminating the backlash and inhibiting means for inhibiting the supported nut from rotating in the direction opposite to the above backlash-eliminating rotation direction, whereby occurrence of the backlash to be caused by wearing of the teeth of the supported nut and/or the lead of the screw shaft is prevented.

4 Claims, 4 Drawing Figures

CARRIER MOVING MECHANISM

BACKGROUND OF THE INVENTION

(1) Field of the Invention

The present invention relates to a carrier moving mechanism for a carrier of the type where teeth of two nuts are brought into contact with confronting side faces of the lead of a screw shaft, for example, a carrier of a printer having a printing head supported thereon, wherein occurrence of the backlash to be caused by wearing of the lead of the screw shaft and/or the nut teeth is prevented.

(2) Description of the Prior Art

A conventional carrier moving mechanism will now be described with reference to FIGS. 1 and 2 of the accompanying drawings. FIG. 1 is a sectional view of the carrier moving mechanism and FIG. 2 is a side view of the carrier moving mechanism. In FIGS. 1 and 2, reference numeral 10 represents a screw shaft having a lead 12, reference numeral 14 represents a first nut having teeth 16 to be engaged with the lead 12 of the screw shaft 10, reference numeral 18 represents a second nut having teeth 20 to be engaged with the lead 12 of the screw shaft 10, and reference numeral 22 represents a carrier. The first and second nuts 14 and 18 are secured by bolts 24.

In the carrier moving mechanism having the structure shown in FIGS. 1 and 2, the backlash is eliminated in the following manner.

First, rotation of the screw shaft 10 is restricted, and the first nut 14 is secured to the carrier 22 by the bolts 24 so that the teeth 16 of the first nut 14 are brought into contact with one side face of the lead 12 of the screw shaft 10. Then, in the same manner as described above, the second nut 18 is secured to the carrier 22 by the bolts 24 so that the teeth 20 of the second nut 18 are brought into contact with the other side face of the lead 12 of the screw shaft 10.

If the first and second nuts 14 and 18 are thus attached to the carrier 22 so that the teeth of both the nuts 14 and 18 are brought into contact with both the side faces of the lead 12 of the screw shaft 10, respectively, the backlash can be eliminated.

In the carrier moving mechanism having the above-mentioned structure, however, if the carrier moving mechanism is used for a long time and the teeth of both the nuts and/or both the side faces of the lead of the screw shaft wear away, the backlash is caused according to the degree of wearing and re-adjustment should be performed. This is the fatal defect of the conventional carrier moving mechanism.

SUMMARY OF THE INVENTION

It is therefore a primary object of the present invention to provide a carrier moving mechanism in which occurrence of the backlash is automatically eliminated even if the carrier moving mechanism is operated for a long time and the teeth of first and second nuts and/or the side faces of the lead of a screw shaft wear away.

More specifically, in accordance with the present invention, there is provided a carrier moving mechanism of the type where teeth of a first nut are brought into contact with one side face of the lead of a screw shaft, teeth of a second shaft are brought into contact with the other side face of the lead of the screw shaft and a carrier having the first and second nuts secured thereto is moved by rotation of the screw shaft, said carrier moving mechanism comprises a supporting mechanism which supports one of the first and second nuts so that said nut is rotatable in the rotation direction of the screw shaft but the rotation of said nut in the axial direction of the screw shaft is restricted, bias means for biassing said nut to rotate in the direction eliminating the backlash and an inhibiting mechanism for inhibiting said nut from rotating in the direction opposite to said backlash-eliminating rotation direction.

The foregoing and other objects and features of the present invention will become apparent from the following detailed description made with reference to the accompanying drawings, which are given by way of example and by no means limit the scope of the invention.

DETAILED DESCRIPTION OF THE PREFERRED EMBODIMENTS

Figure 1:
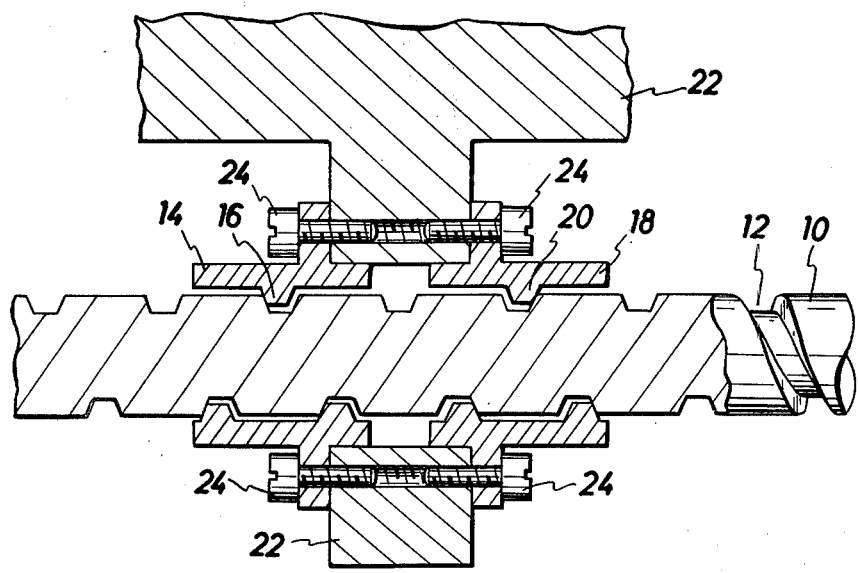
FIG. 1 is a sectional view illustrating the conventional carrier moving mechanism.
Figure 2:
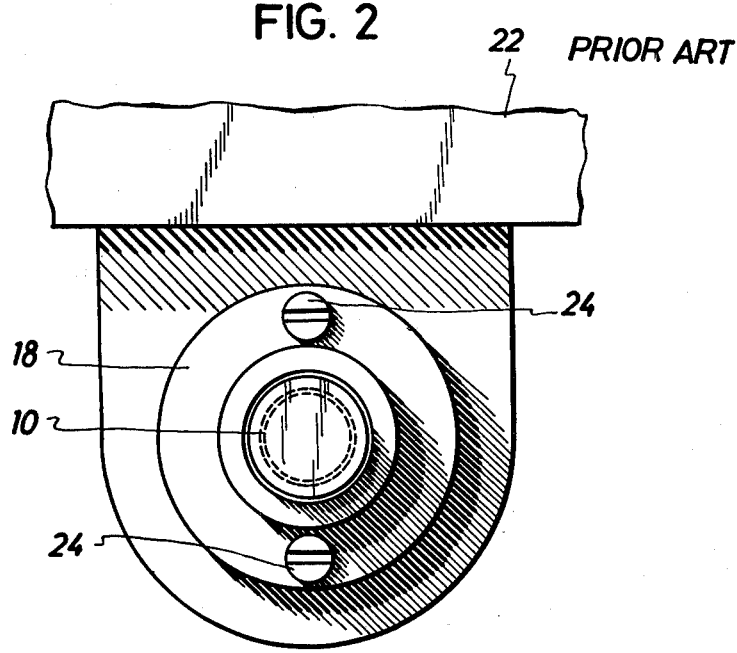
FIG. 2 is a side view of the conventional carrier moving mechanism shown in FIG. 1.
Figure 3:
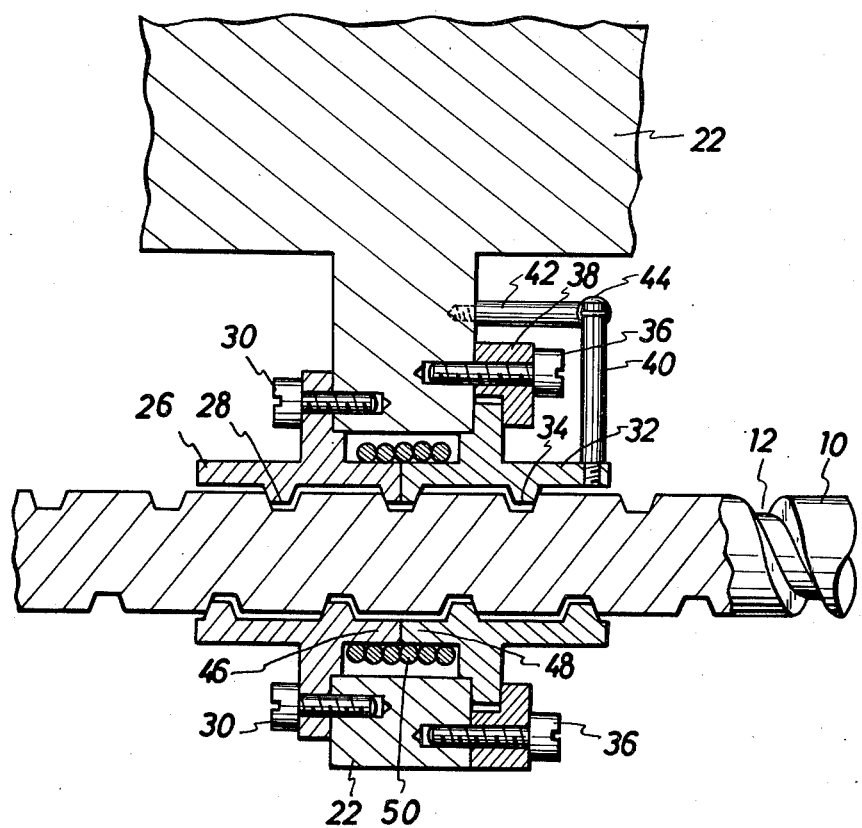
FIG. 3 is a sectional view illustrating a carrier moving mechanism according to one embodiment of the present invention.
Figure 4:
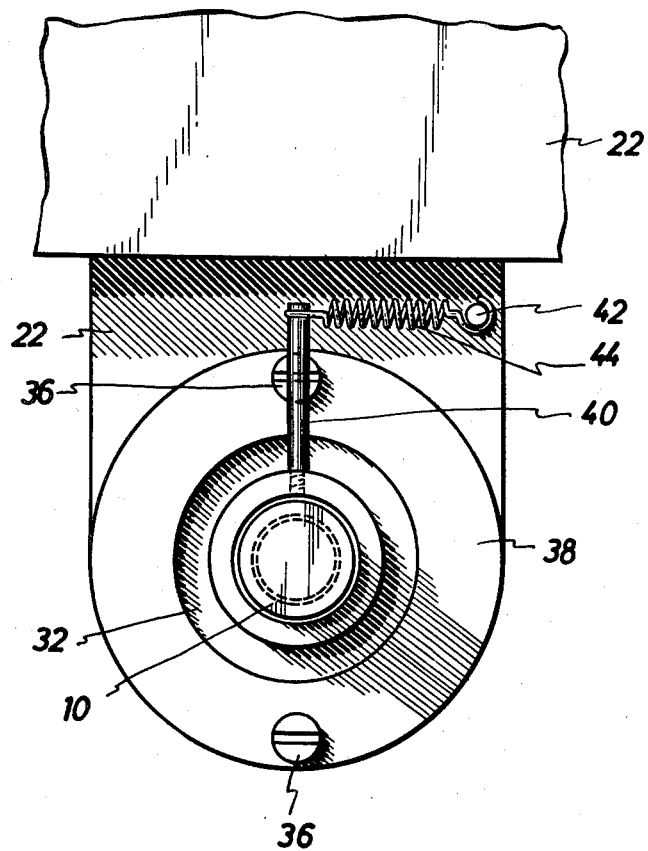
FIG. 4 is a side view of the carrier moving mechanism of the present invention shown in FIG. 3.

Referring to FIGS. 3 and 4 illustrating one embodiment of the carrier moving mechanism of the present invention, a screw shaft 10 has a spiral lead 12 formed on the periphery thereof and it is driven and rotated by a drive source not shown in the drawings. A carrier 22 is arranged to move along the screw shaft 10. A first nut 26 has teeth 28 to be engaged with the lead 12 of the screw shaft 10 and is secured to the carrier 22 by bolts 30 so that the carrier 22 is moved by rotation of the screw shaft 10. When this first nut 26 is secured to the carrier 22, the nut 26 is fixed by the bolts 30 so that the teeth 28 of the nut 26 are brought into contact with one side face of the lead 12 of the screw shaft 10.

A second nut 32 has teeth 34 to be engaged with the lead 12 of the screw shaft 10 and is screwed to the screw shaft 10, and the second nut 32 is attached and gripped between the carrier 22 and a flange ring 38 secured thereto by means of bolts 36 so that the second nut 32 is rotatably supported and the movement of the second nut 32 in the axial direction of the screw shaft 10 is restricted.

A post 40 is secured to the second nut 32 and a post 42 is secured to the carrier 22, and both the posts 40 and 42 are arranged so that their end portions confront each other. A spring 44 is laid out between both the posts 40 and 42 to bias the second nut 32 to rotate the second nut 32 in the clockwise direction in FIG. 4. By this arrangement, the teeth 34 of the second nut 32 are always brought into contact with the lead 12 of the screw shaft 10 on the side face opposite to the side face with which the teeth 28 of the first nut 26 are brought into contact.

Both the first nut 26 and second nut 32 have extensions 46 and 48, respectively, which confront each other, and a one-way clutch spring 50 is wound around the peripheral faces of the extensions 46 and 48. When the lead 12 of the screw shaft 10 is, for example, of the right-handed twining, this one-way clutch spring 50 is of the right-handed twining. In this arrangement, since the one-way clutch spring 50 always acts in the closing direction even if the second nut 32 is going to rotate in the counterclockwise direction in FIG. 4, the rotation of the second nut 32 in the counterclockwise direction can always be prevented.

In the carrier moving mechanism having the above-mentioned structure, the first nut 26 is secured to the carrier 22 in the state where the teeth 28 of the first nut 26 are brought into contact with one side face of the lead 12 of the screw shaft 10, and the second nut 32 is rotatably biassed by the spring 44 so that the teeth 34 of the second nut 32 are always brought into contact with the other side face of the lead 12 of the screw shaft 10, with the result that also the first nut 26 is pressed to the screw shaft 10 and the teeth 28 of the first nut 26 are pressed to said one face of the lead 12 of the screw shaft 10 to have abutting contact therewith.

Even if the carrier moving mechanism is operated for a long time in the state where the teeth 28 and 34 of the first and second nuts 26 and 32 are brought in abutting contact with the side faces of the lead 12 of the screw shaft 10 and these teeth 28 and 34 wear away more or less, by dint of the biassing action of the spring 44, the abutting contact of the teeth 28 and 34 of both the nuts 26 and 32 with the side faces of the lead 12 of the screw shaft 10 is always maintained and occurrence of the backlash of the carrier can be prevented completely.

In the foregoing embodiment, the one-way clutch spring is used as means for preventing reverse rotation of the second nut. However, this means is not limited to such one-way clutch spring, but a ratchet or other reverse rotation-preventing mechanism may be used.

As will be apparent from the foregoing description, according to the carrier moving mechanism of the present invention, even if the teeth of the first and second nuts and/or the side faces of the lead of the screw shaft wear away, the teeth of both the nuts are always kept in abutting contact with the side faces of the lead of the screw shaft by the biassing action of the spring. Therefore, occurrence of the backlash can be prevented completely and the carrier can always be moved smoothly.

The foregoing description and accompanying drawings merely illustrate the basic mode of the present invention, and as will be apparent to those skilled in the art, various omissions, substitutions or modifications may be made within the scope of the present invention.

What is claimed is:

1. A carrier moving mechanism comprising a screw shaft, having a lead having opposite side faces, said screw shaft being rotated in a direction, first and second nuts having teeth to be engaged with the lead of the screw shaft and a carrier to which the first and second nuts are secured, wherein the teeth of the first nut are brought into contact with one side face of said opposite side faces of the lead of the screw shaft, the teeth of the second nut are brought into contact with the other side face of said opposite side faces of the lead of the screw shaft and the carrier is moved through the first and second nuts by rotation of the screw shaft, said carrier moving mechanism being characterized in that said carrier moving mechanism further comprises a supporting mechanism which supports one of the first and second nuts on the carrier so that said nut can be rotated in the rotation direction of the screw shaft but the movement of said nut in the axial direction of the screw shaft is restricted, bias means for biasing said nut to rotate said nut in a direction to eliminate backlash and an inhibiting mechanism for inhibiting said nut from rotating in the direction opposite to said direction to eliminate backlash.

2. A carrier moving mechanism according to claim 1, wherein the supporting mechanism is a flange ring secured to the carrier and one of the first and second nuts is gripped and supported between the carrier and the flange ring.

3. A carrier moving mechanism according to claim 1, wherein the biassing means comprises a post secured to the nut supported by the supporting mechanism, a post secured to the carrier and a spring which is laid out between said two posts to rotatably bias said nut.

4. A carrier moving mechanism according to claim 1, wherein the inhibiting mechanism is a one-way clutch spring wound around on the peripheral faces of the first and second nuts.

* * * * *